United States Patent Office 3,303,240
Patented Feb. 7, 1967

3,303,240
NOVEL SELF-EXTINGUISHING POLYESTERS PREPARED FROM POLYOLS OF PERCHLORINATED DIAMINODIPHENYLS
Laszlo Szobel, Grenoble, and Ludovic Parvi, Pont-de-Claix, France, assignors to Societe d'Electro-Chimie, d'Electro-Metallurgie et des Acieries Electriques d'Ugine, Paris, France, a corporation of France
No Drawing. Filed July 10, 1963, Ser. No. 294,171
Claims priority, application France, July 12, 1962, 903,825
19 Claims. (Cl. 260—869)

This invention relates to:

(1) Novel self-extinguishing polyesters obtained by the esterification of polyols derived from polychlorinated diaminodiphenyls;

(2) Copolymerizable compounds or compositions containing the novel self-extinguishing polyesters, as well as copolymers resulting therefrom.

The polyols which we use to obtain the novel polyester are part of the group of products which form the object of the applicants' French patent application 899,999, filed on June 7, 1962, for "Novel Industrial Products Formed by the Biaminated Derivatives of Polychlorodiphenyl," and of applicants' corresponding U.S. application Serial No. 285,869, filed June 6, 1963. The polyols used in our invention have the general formula:

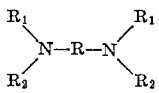

in which:

R represents a diphenyl radical containing more than four atoms of chlorine,

N is an amine function which is one of secondary and tertiary, $R_1$ is selected from the group consisting of a saturated aliphatic radical, an unsaturated aliphatic radical, a cyclic radical, a heterocyclic radical, each radical having at least one hydroxyl function, $R_2$ is selected from the group consisting of an atom of hydrogen, a saturated aliphatic radical, an unsaturated aliphatic radical, a cyclic radical, a heterocyclic radical, a radical identical to those radicals of $R_1$.

Particularly suitable polyols derived from diaminopolychlorodiphenyls are those in which:

R represents the different isomers of the octochlorodiphenyl radical, taken separately or in mixture, N represents a secondary amine function, $R_1$ is selected from the group consisting of a saturated aliphatic radical, an unsaturated aliphatic radical, a cyclic radical, a heterocyclic radical, each radical having an OH function and having less than 3 atoms of carbon, $R_2$ is an atom of hydrogen.

The N,N'-bis(ethane 2-ol) diamino octochlorodiphenyl resulting from the condensation of decachlorodiphenyl with monoethanolamine is one preferred polyol.

The polyols derived from the diaminopolychlorodiphenyls are used alone or in mixture with other halo- or non-halo-polyalcohols, thus, for example, with N,N,N',N'-tetrakis(ethane 2-ol) diamino octochlorodiphenyl, ethylene glycol, propylene glycol, polypropylene glycol, glycerin, trimethylol-propane, etc.

The saturated aliphatic polyacids are especially suitable as acid esterification agents, such as adipic acid and its lower and upper homologues, halo- and non-halo-aromatic diacids, for example, the phthalic acids, tetrahydrophthalic, tetrachlorophthalic, terephthalic, HET acid (made by the addition of hexachlorocyclopentadiene to maleic anhydride), the polyacids derived from halo-polyphenols, such as for example those which may be manufactured according to the applicants' French patent application 899,999 of June 7, 1962, already referred to, and according to a United States patent application of Messrs. Laszlo Szobel, Maurice Troussier and Jacques Vuillemenot, filed February 6, 1963, Serial No. 256,532, now abandoned, for "Polyacids and Polyesters Derived From Halogenated Polyphenols and Process for Preparation of Same." Esterification may also be effected with unsaturated diacids such as fumaric acid, maleic anhydride, etc. All these acids, saturated or not, halogenated or not, may be used alone or in mixture.

To prepare the polyesters of our invention, we use the relative amounts of acid and alcohol generally employed in the operations of esterification, that is to say an amount of diacid containing a number of acid functions close to the number of alcohol functions to esterify. However it may be advisable to use an excess of one of these alcohols, specially if this one has a high vapour pressure at the used temperature.

The polyesters of our invention differ from the conventional polyesters by their noteworthy resistance against the flame, which is due to their high chlorine content and to using a special diol containing a high proportion of chlorine directly bonded to a diphenyl nucleus.

The higher the chlorine content is, the stronger the resistance against the flame is. For an equal resistance against the flame, it may be weaker for a dense-massed product than for a large-surfaced one, such as a foam. The polyesters of our invention have noticeable resistance against the flame if their chlorine content directly bonded to the diphenyl nucleus of one of their components is at least 20%, but we prefer the polyesters whose chlorine content is at least 30%.

The invention equally relates to the copolymerizable compositions containing the polyesters forming the object of the present application, as well as to the copolymers resulting therefrom. These compositions and these copolymers are preferably prepared with a proportion of said polyesters such that their chlorine content is at least 20%, or preferably at least 30%.

In the case in which the polyesters according to the invention are not saturated, they are compatible with polymerizable ethylenic compounds such as styrene or allylphthalate, and the copolymers thus obtained are characterized by their self-extinguishing properties.

In the case in which the polyesters are saturated, they render it possible to obtain either a self-extinguishing high molecular weight polymer, or a copolymer with a di-isocyanate, for example, which will equally be self-extinguishing.

The polyesters according to the invention, as well as the copolymerizable compositions and the copolymers resulting therefrom, have a vast range of applications, for example, in the industries applying resins reinforced with glass or other fibers, in the production of polyurethanes, various coating products, etc.

The following, non-limiting examples exemplify the novel polyesters according to the invention and some of the possible production processes.

Example 1

131.4 parts of adipic acid was reacted with 40.2 parts of trimethylolpropane and 493.1 parts of N,N'-bis(ethane 2-ol) diamino octochlorodiphenyl in a nitrogen atmosphere and under agitation. The temperature was raised progressively to 180° C. and subsequently maintained for 2 hours.

The reactive mixture was then subjected to a vacuum of 13 mm. of mercury, and the temperature was raised to 190° C. for 2 hours. The water resulting from condensation was eliminated as it was formed.

After cooling, a solid polyester resin was obtained whose softening point, as measured by the ring and ball method was 81° C. Its chlorine content amounted to 40.4%, its acid number to 7.6, its hydroxyl value to 180, which corresponds to 3% of the OH groups.

The polyester obtained was of the type:

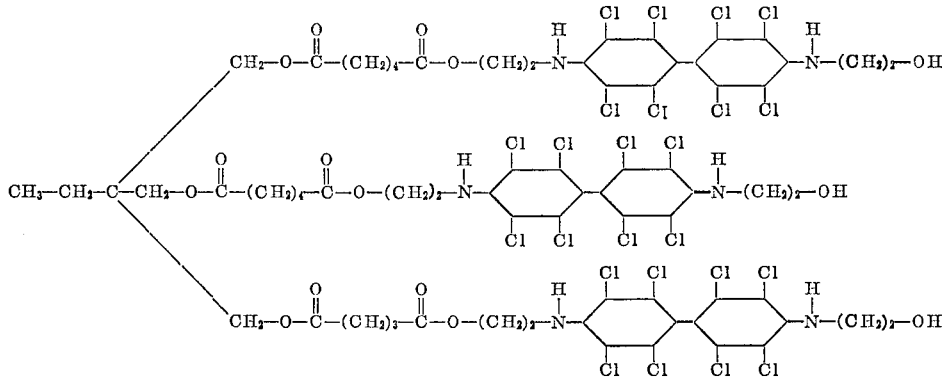

It wholly fulfilled the requirements of the ASTM D757–49 and D635–56T tests. Moreover, the polyester went out as soon as it had been withdrawn from the flame of a torch in which it had been placed, which is not required by tests referred to above.

*Example 2*

0.25 mol of adipic acid and 0.75 mol of maleic anhydride were reacted in a nitrogen atmosphere and under agitation, with 1.02 mols of N,N'-bis(ethane 2-ol) diamino octochlorodiphenyl. The temperature of the mixture was raised progressively to 180° C. and this temperature was subsequently maintained for 2 hours.

The reactive mixture was then subjected to a pressure lower than 1 mm. of mercury and the temperature was raised to 190° C., the reaction being stopped before reaching gelation. The water resulting from condensation was eliminated as it was formed.

1% of hydroquinone was added to the reactive mixture, which was allowed to cool. A solid polyester resin was obtained, which is soluble in styrene and has a chlorine content of 44.7% and an acid number of 20.2.

It wholly fulfilled the requirements of the ASTM D757–49 and D635–56T tests. It went out, moreover, as soon as it was withdrawn from the flame of a torch in which it had been placed, which is not required by the tests referred to above.

*Example 3*

70 parts of the polyester obtained in Example 2 were copolymerized with 30 parts of styrene in the presence of 0.5% of benzoyl peroxide.

The copolymer obtained contained approximately 31% of chlorine and it wholly fulfilled the requirements of the ASTM D757–49 and D635–56T tests. It went out, moreover, as soon as it was withdrawn from the flame of a torch in which it had been placed, which is not required by the tests referred to above.

*Example 4*

14.6 parts of adipic acid and 9.8 parts of maleic anhydride were reacted with a mixture composed of 6.08 parts of propylene glycol and 65.8 parts of N,N'-bis(ethane 2-ol) diamino octochlorodiphenyl in a nitrogen atmosphere, by stirring vigorously. The temperature of the reaction mixture was gradually brought to 190° C. for 3 hours. The progress of the esterification was controlled by measuring the amount of water liberated and by determining the acid index of the samples taken. After these 3 hours, the reaction mixture was placed under vacuum for 15 minutes in the course of which the temperature was kept at 190–195° C.

A polyester resin was obtained whose molecular weight was between 2,200 and 2,300, whose acid index was 21.8, and whose chlorine content was 37.4%.

The polyester thus obtained fully satisfied the ASTM D757–49 and D635–56T tests; moreover, it went out when it was withdrawn from the flame of a burner into which it had been placed.

*Example 5*

65 parts of the polyester obtained in Example 4 were dissolved in 35 parts of styrene and thus we obtained a solution which had a density of 1.26 at 20° C. and a viscosity of 12.7 poises at 25° C. 1% of Lucidol 350 (a paste of peroxide of benzoyl in dibutyl phthalate) and 0.5% of Trigonox HM–80 (peroxide of methylisobutylketone) were added. With the viscous mixture thus obtained, a glass cloth weighing 450 g./m.² was impregnated and coated and it was then placed in an oven for ½ hour at 90° C., and then for ½ hour at 110° C.

A self-extenguishing stratified polyester glass cloth which was obtained satisfied the ASTM D757–49 and D635–56T tests, as well as according to the English standard BSI476, 1955, part 2. Its Barcol hardness was 40–50.

*Example 6*

65 parts of the polyester obtained in Example 4 were dissolved in 35 parts of styrene and a solution was obtained having a density of 1.26 at 20° C. and a viscosity of 12.7 poises at 25° C. 1% of Butanox (solution of peroxide of methylethylketone in dimethyl phthalate with a pure peroxide content of 50%) and 0.4% of octoate of cobalt were added. With the viscous mixture thus obtained, a glass cloth weighing 450 g./m.² was impregnated and coated, and left to polymerize at ambient temperature for 10 hours.

A self-extinguishing stratified polyester glass cloth which was obtained met the ASTM D757–49 and D635–56T tests, as well as according to the English standard BSI476, 1955, part 2. Its Barcol hardness was 40–50.

*Example 7*

14.6 parts of phthalic anhydride and 9.8 parts of maleic anhydride were reacted with a mixture composed of 6.08 parts of propylene glycol and 65.8 parts of N,N'-bis(ethane 2-ol) diamino octochlorodiphenyl in a nitrogen atmosphere by stirring vigorously. The temperature of the reaction mixture was gradually brought to 190° C. for 3 hours. The progress of the esterification reaction was controlled by measuring the amount of water liberated and by determining the acid index of the samples taken. After these 3 hours, the reaction mixture was put under vacuum for 15 minutes in the course of which the temperature was kept at 190–195° C.

A polyester resin which was obtained had a molecular weight of 2,200–2,300, an acid index of 15.9, and a chlorine content of 42.75%.

The polyester thus obtained fully satisfied the ASTM D757–49 and D635–56T tests; moreover, it went out when withdrawn from the flame of a burner into which it had been placed.

*Example 8*

A mixture of 54.8 parts of N,N'-bis(ethane 2-ol) diamino octochlorodiphenyl and 15.2 parts of propylene glycol was reacted with 69.3 parts of octochlorodihydroxydiphenyl by heating it to 150° C. in a nitrogen atmosphere and under vigorous stirring conditions. Then 14.7 parts of maleic anhydride were added. Stirring was continued in a nitrogen atmosphere and the temperature was gradually raised to 180° C. and then maintained at this temperature for 15 hours. Then, the temperature was raised to 190° C. and the reaction mixture was placed under vacuum for 3 hours.

A polyester resin which was obtained had an acid index of 67.7 and a chlorine content of 47.2%.

The polyester thus obtained completely satisfied the requirements of the ATSM D757–49 and D635–56T tests; moreover, it went out when withdrawn from the flame of a burner into which it had been placed.

*Example 9*

A mixture of 572.7 parts of N,N'-bis(ethane 2-ol) diamino octochlorodiphenyl and 5.8 parts of diethylene glycol was reacted with 80.3 parts of adipic acid and 53.9 parts of maleic anhydride in a nitrogen atmosphere by stirring vigorously.

The temperature of the reaction mixture was gradually brought to 190° C., which was maintained for 3 hours. The progress of the esterification reaction was controlled by measuring the quantity of the water liberated and by determining the acid index of the samples taken. After these three hours, the reaction mixture was put under vacuum for 15 minutes, in the course of which the temperature was kept between 190–195° C.

A polyester resin which was obtained had an acid index of 37.7, and a chlorine content of 41%.

The polyester thus obtained completely satisfied the requirements of the ASTM D757–49 and D635–56T tests; moreover, it went out when it was withdrawn from the flame of a burner into which it had been placed.

*Example 10*

118.3 parts of adipic acid and 12.06 parts of trimethylolpropane were reacted with 444 parts of N,N'-bis(ethane 2-ol) diamino octochlorodiphenyl in a nitrogen atmosphere at 120° C., with vigorous stirring. The temperature was gradually brought to 180° C. at the rate of 10° C. per hour. Then the reaction mixture was put under vacuum and the temperature was gradually raised to and kept at 200° C. for 7 hours.

After cooling, a polyester resin was obtained whose softening point, measured by the ring and ball method, was 97° C.; its chlorine content was 42.2%, its acid index was 1.8, and its hydroxyl index was 61.

The polyester thus obtained completely satisfied the requirements of the ASTM D757–49 and D635–56T tests; moreover, the product went out when it was withdrawn from the flame of a burner into which it had been placed.

*Example 11*

109.5 parts of adipic acid and 6.7 parts of trimethylpropane were reacted with 411 parts of N,N'-bis(ethane 2-ol) diamino octochlorodiphenyl, in a nitrogen atmosphere at 120° C. and with vigorous stirring. The temperature was raised gradually to 180° C. at the rate of 10° C. per hour. The reaction mixture was put under vacuum and the temperature was gradually raised to and kept at 200° C. for 7 hours.

After cooling, a polyester resin was obtained whose softening point, measured by the ring and ball method, was 105° C.; its chlorine content was 42.5%, and its acid index was 2.0.

The polyester thus obtained completely satisfied the requirements of the ASTM D757–49 and D635–56T tests; moreover, the product went out when it was withdrawn from the flame of a burner into which it had been placed.

*Example 12*

A mixture composed of 109.6 parts of N,N'-bis(ethane 2-ol) diamino octochlorodiphenyl and 7.6 parts of propylene glycol was reacted with 43.8 parts of adipic acid and 13.4 parts of trimethylolpropane in a nitrogen atmosphere and with stirring. The temperature was gradually brought to 180° C. and this temperature was maintained for 2 hours. The reaction mixture was then put under a vacuum of 13 mm. of mercury and the temperature raised to 190° C. for 2 hours. The water resulting from the condensation was eliminated simultaneously as it was formed.

After cooling, a solid polyester resin was obtained whose softening point, measured by the ring and ball method, was between 65–66° C.; its chlorine content was 34.3%, its acid index was 3.4, and its hydroxyl index was 160, which corresponds to 3% of OH groups.

The polyester thus obtained completely satisfied the requirements of the ASTM D757–49 and D635–56T tests; moreover, the product went out when it was withdrawn from the flame of a burner into which it had been placed.

*Example 13*

3447 parts of N,N'-bis(ethane 2-ol) diamine octochlorodiphenyl were melted while stirring in a nitrogen atmosphere. Under continuous stirring and while introducing nitrogen bubble by bubble into the reaction mixture, 94 parts of trimethylolpropane and 918 parts of adipic acid were added. In one hour the temperature was brought to 150° C., then heating was continued to raise the temperature 10° C. per hour. At the end of 5 hours, approximately 195° C. was reached. The reaction product was put under a vacuum of 12 mm. of mercury and was kept under these conditions for about 10 hours. The course of the reaction was followed by measuring the amount of water eliminated and by determining the acid index. The reaction was stopped when the latter became less than 2. The polyester thus obtained was of the following type:

$$CH_3-CH_2-C[CH_2-O-\left(\underset{O}{\underset{\|}{C}}-(CH_2)_4-\underset{O}{\underset{\|}{C}}-O-(CH_2)_2-\underset{H}{\underset{|}{N}}-\left\langle\underset{Cl\;\;Cl}{\overset{Cl\;\;Cl}{\phantom{X}}}\right\rangle-\left\langle\underset{Cl\;\;Cl}{\overset{Cl\;\;Cl}{\phantom{X}}}\right\rangle-\underset{H}{\underset{|}{N}}-(CH_2)_2-O\right)_x-H]_3$$

Its softening point, measured by the ring and ball method, was 95° C., its chlorine content was 40.15%, and its hydroxyl index was 58.3.

The polyester completely satisfied the requirements of the ASTM D757–49 and 635–56T tests. Moreover, the product went out when it was withdrawn from the flame of a burner into which it has been placed.

*Example 14*

109.5 parts of adipic acid were reacted with 33.5 parts of trimethylolpropane and with a mixture consisting of 274 parts of N,N'-bis(ethane 2-ol) diamino octochlorodiphenyl and 22.5 parts of 1.3 butylene-glycol, in a nitrogen atmosphere and by stirring. The temperature was brought gradually to 180° C., and this temperature was then maintained for 2 hours.

Then the reaction mixture was put under a vacuum of 13 mm. of mercury, and the temperature brought to 190° C. for 2 hours. The water resulting from the condensation was eliminated as it was formed.

After cooling, a solid polyester resin was obtained whose softening point, measured by the ring and ball method, was 65–70° C. Its chlorine content was 32.3%, its acid index was 1.8, and it contained 2.1% of OH groups.

It completely satisfied the requirements of the ASTM D737–49 and 635–56T tests. Moreover, the product went out when it was withdrawn from the flame of a burner into which it had been placed.

*Example 15*

151.5 parts of sebacic acid were reacted with 23 parts of glycerin and with 411 parts of N,N'-bis(ethane 2-ol) diamino octochlorodiphenyl in a nitrogen atmosphere and while being stirred. The temperature was brought gradually to 180° C. and was maintained there for 2 hours.

Then the reaction mixture was put under a vacuum of 13 mm. of mercury, and the temperature raised to 190° C. for 2 hours. The water resulting from the condensation was eliminated as soon as it was formed.

After cooling, a solid polyester resin was obtained whose softening point, measured by the ball and ring method, was 70–73° C. Its chlorine content was 38.1%, its acid index was 1.5, and it contained 2.1% of OH groups.

It completely satisfied the requirements of the ASTM D757–49 and D635–56T tests. Moreover, the product went out when it was withdrawn from the flame of a burner into which it had been placed.

*Example 16*

A mixture of 75.75 parts of sebacic acid and 54.75 parts of adipic acid were reacted with 23 parts of glycerin and 411 parts of N,N'-bis(ethane 2-ol) diamino octochlorodiphenyl in a nitrogen atmosphere and while being stirred. The temperature was raised gradually to 180° C. and was maintained there for 2 hours.

Then the reaction mixture was put under a vacuum of 13 mm. of mercury and the temperature raised to 190° C. for 2 hours. The water resulting from the condensation was eliminated simultaneously as it was formed.

After cooling, a solid polyester resin was obtained whose softening point, measured by the ring and ball method, was 74–77° C. Its chlorine content was 39.6%, its acid index 2.5, and it contained 2.2% of hydroxyl groups.

It completely satisfied the requirements of the ASTM D757–49 and 635–56T tests. Moreover, the product went out when it was removed from the flame of a burner into which it had been placed.

*Example 17*

A mixture of 43.8 parts of adipic acid and 29.4 parts of maleic anhydride were reacted with 26.8 parts of trimethylolpropane and 328.8 parts of N,N'-bis(ethane 2-ol) diaminio octohlorodiphenyl. The temperature of the mixture was gradually raised to 180° C. and was there maintained for 2 hours.

Then the reaction mixture was put under a vacuum of 13 mm. of mercury and the temperature was raised to 190° C. for 2 hours. The water resulting from the condensation was eliminated simultaneously as it was formed.

After cooling, a solid polyester resin was obtained. Its chlorine content was 40.7%, its acid index was 15.7, and it contained 3% of hydroxyl groups.

It completely satisfied the requirements of the ASTM D757–49 and 635–56T tests. Moreover, the product went out when it was withdrawn from the flame of a burner into which it had been placed.

While we have shown and described preferred embodiments of our invention, it may be otherwise embodied within the scope of the appended claims.

We claim:
1. A polyester resulting from the esterification by dicarboxylic acids of polyols having the general formula

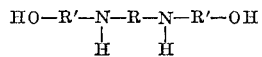

in which R represents the octochlorodiphenyl radical, and R' is selected from the group consisting of alkyl radical having from 2 to 8 carbon atoms, hydroxy lower alkyl radical, allyl, benzyl,

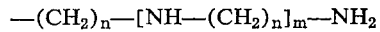

in which $n$ is between 2 and 6 and $m$ is between 0 and 3.

2. A polyester as described in claim 1 in which the polyols are mixed prior to esterification with at least one of a halo- and of a non-halo-polyalcohol.

3. A polyester as described in claim 2 in which said halo- and non-halo-polyalcohols are selected from the group consisting of N,N,N',N'-tetrakis(ethane 2-ol) diamino octochlorodiphenyl, ethylene glycol, propylene glycol, polypropylene glycol, glycerin, trimethlolpropane.

4. A copolymerizable composition comprising a polymerizable agent and a polyester as described in claim 1.

5. A copolymer of one of an ethylenic compound and of a di-isocyanate with a self-extinguishing polyester as described in claim 1.

6. A self-extinguishing polyester comprising an esterified N,N'-bis(ethane 2-ol) diamino octochlorodiphenyl, said polyester having a chlorine content equal to at least 20%.

7. A copolymerizable composition comprising a polymerizable agent and a self-extinguishing polyester according to claim 6.

8. A copolymer of one of an ethylenic compound and of a di-isocyanate with a self-extinguishing polyester according to claim 6.

9. A self-extinguishing polyester derived from an esterified mixture of N,N'-bis(ethane 2-ol) diamino octochlorodiphenyl, and of at least one of a halo- and of a non-halo-polyalcohol, said polyester having a chlorine content equal to at least 20%.

10. The polyester of claim 9 characterized by said halo- and non-halo-polyalcohols being selected from the group consisting of N,N,N',N'-tetrakis(ethane 2-ol) diamino octochlorodiphenyl, ethylene glycol, propylene glycol, polypropylene glycol, glycerin, trimethlolpropane.

11. A copolymerizing composition comprising a polymerizable agent and a polyester as described in claim 1, said composition having a chlorine content equal to at least 20%.

12. The copolymerizable composition of claim 11 characterized by said polymerizable agent being selected from the group consisting of an ethylenic compound and a di-isocyanate.

13. The copolymerizable composition of claim 11 characterized by said polymerizable agent being selected from the group consisting of styrene, allyl phthalate, and a di-isocyanate.

14. A copolymerizable composition comprising a polymerizable agent and a self-extinguishing polyester according to claim 6, said composition having a chlorine content of at least 20%.

15. The copolymerizable composition of claim 14 characterized by said polymerizable agent being selected from the group consisting of an ethylenic compound and a di-isocyanate.

16. The copolymerizable composition of claim 14 characterized by said polymerizable agent being selected from the group consisting of styrene, allyl phthalate, and a di-isocyanate.

17. A copolymer of one of an ethylenic compound and of a di-isocyanate with a self-extinguishing polyester as described in claim 1, said composition having a chlorine content equal to at least 20%.

18. The copolymer of claim 17 characterized by said ethylenic compound being selected from the group consisting of styrene and allyl phthalate.

19. A copolymer of one of an ethylenic compound and of a di-isocyanate with a self-extinguishing polyester according to claim 6, said composition having a chlorine content equal to at least 20%.

References Cited by the Examiner

UNITED STATES PATENTS 3,102,105  8/1963  Collardean et al. ----- 260—869

FOREIGN PATENTS 1,000,998  1/1957  Germany.

MURRAY TILLMAN, *Primary Examiner.*

J. T. GOOLKASIAN, *Assistant Examiner.*